US006009512A

United States Patent [19]
Christie

[11] Patent Number: 6,009,512
[45] Date of Patent: Dec. 28, 1999

[54] MECHANISM FOR FORWARDING OPERANDS BASED ON PREDICATED INSTRUCTIONS

[75] Inventor: David S. Christie, Austin, Tex.

[73] Assignee: Advanced Micro Devices, Inc., Sunnyvale, Calif.

[21] Appl. No.: 08/958,477

[22] Filed: Oct. 27, 1997

[51] Int. Cl.[6] .................................................. G06F 9/318
[52] U.S. Cl. ........................................ 712/226; 712/218
[58] Field of Search ................................ 395/582, 581, 395/583, 567, 394; 712/235, 234, 236, 226, 218

[56] References Cited

U.S. PATENT DOCUMENTS

5,471,593  11/1995  Branigin .................................... 712/235

OTHER PUBLICATIONS

Mahlke, Scott A. et al., A Comparison of Full and Partial Predicated Execution Support for ILP Processors, 1995, ACM, pp. 138–149.
Johnson, Richard et al., Analysis Techniques for Predicated Code, 1996, IEEE, pp. 100–113.
Tyson, Gary Scott, The Effects of Predicated Execution on Branch Prediction, 1994, ACM, pp. 196–206.
August, David J. et al., A Framework for Balancing Control Flow and Predication, 1997, IEEE, pp. 92–103.
Kathail et al., HPL Playdoh Architecture Specification: Version 1.0, Hewlett Packard, Computer Systems Laboratory, HPL–93–80, Feb., 1994, pp. 1–48.

*Primary Examiner*—Richard L. Ellis
*Attorney, Agent, or Firm*—Conley, Rose & Tayon; Lawrence J. Merkel; B. Noel Kivlin

[57] ABSTRACT

A method and apparatus for providing predicated instructions in a processor employing out of order execution. In one embodiment, a plurality of decode units are configured to decode a plurality of variable byte length instructions and to provide a plurality of output of signals. The output signals are provided to a plurality of reservation stations coupled to the plurality of decode units within the superscalar microprocessor. Functional units are configured to receive the output signals from the plurality of decode units. The functional units include function execution units coupled to receive signals from the plurality of reservation stations and to provide a function output responsive to the output signals. The functional units further comprise a predication unit configured to determine whether a predetermined condition has occurred and either stop the function output or allow the function output to be transmitted depending on whether the predetermined condition has occurred.

22 Claims, 9 Drawing Sheets

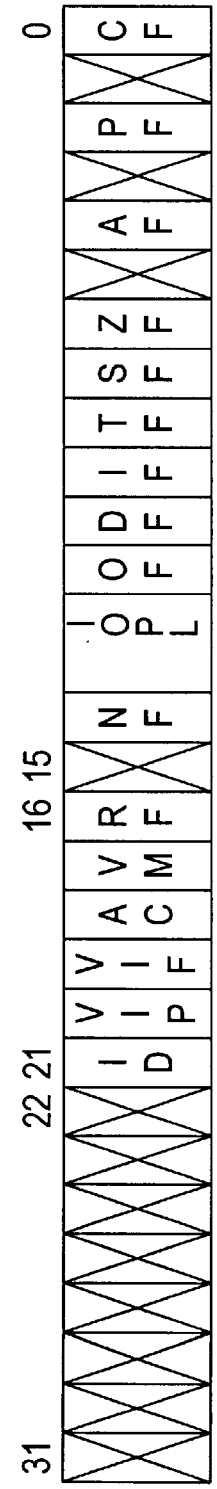

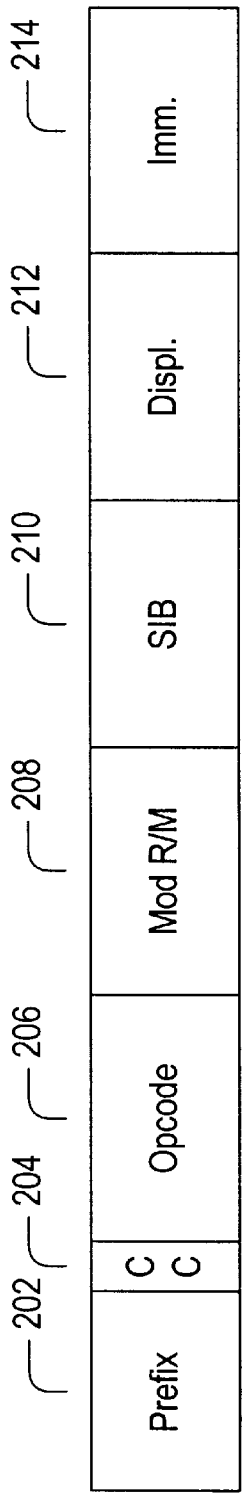
FIG. 7 Condition-Code-Based Predicated Instruction
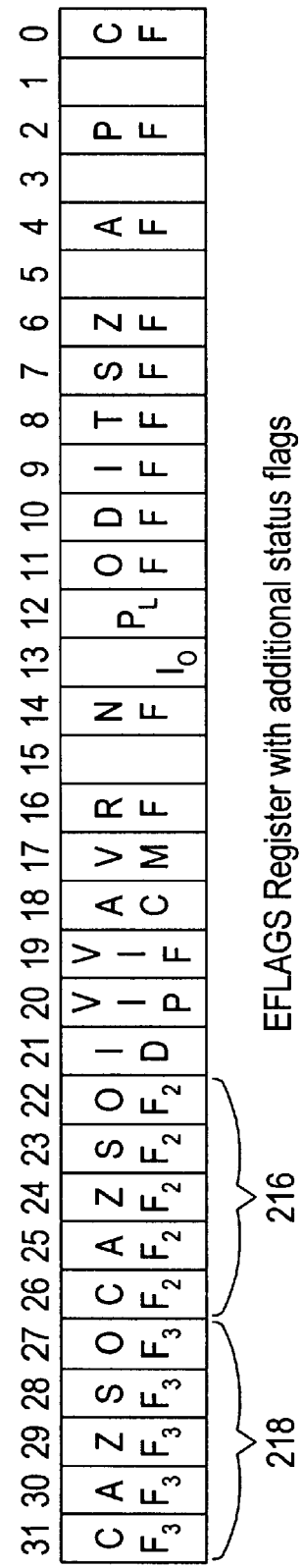
FIG. 8 EFLAGS Register with additional status flags Set Predicate Flag Instruction Predicated Instruction identifying Predicate Flag(s)

Predicated Instruction including both condition code and predicate flags

MECHANISM FOR FORWARDING OPERANDS BASED ON PREDICATED INSTRUCTIONS

FIELD OF THE INVENTION

This invention relates to implementing conditional instructions in a computer system and, more particularly, to a method and apparatus for providing support for predicated instructions in an X86 architecture.

BACKGROUND OF THE INVENTION

A common method of selectively performing operations in a computer system is to use conditional jumps to skip over sections of code. A conditional jump instruction examines some predetermined state to determine whether the instructions immediately following it should be executed (the sequential instructions) or if instructions at a target address of the jump instruction should be executed. When the target address of the jump instruction specifies an instruction which is within the sequential path of the jump instruction, the intervening instructions are effectively skipped over if the target address is selected. In the X86 architecture, conditional jump instructions use condition codes to specify what state certain EFLAGS register status bits should be in for the jump to be taken. The EFLAGS status bits are typically set as the result of a previous arithmetic or logical instruction.

FIG. 1—Exemplary x86 Instruction

A brief description of the X86 instruction and EFLAGS registers is deemed appropriate. Turning now to FIG. 1, a generic format illustrative of the X86 instruction set is shown. As illustrated, an X86 instruction comprises from one to five optional prefix bytes 2, followed by an operation code (opcode) field 4, an optional addressing mode (MODR/M) byte 6, an optional index-scale-base (SIB) byte 8, an optional displacement field 10 and an optional immediate data field 12.

The opcode field 4 defines the basic operation for a particular instruction. The default operation of a particular opcode may be modified by one or more prefix bytes. For example, a prefix byte may be used to change the address or operand size for an instruction to override the default section used in memory addressing or to instruct the processor to repeat a string operation a number of times. The opcode field 4 follows the prefix bytes 2, if any, and may be one or two bytes in length. Within the opcode field, smaller encoding fields may be defined which may vary according to the class of operation. Such fields may define information such as the direction of the operation, size of displacement, encoding of registers, sign extension and encoding of conditional test fields, as will be discussed in more detail below.

The addressing mode, MODR/M, byte 6 specifies the registers used, as well as memory addressing modes. The scale index base (SIB) byte 8 is used only in 32-bit base relative addressing using scale and index factors. A base field of the SIB byte specifies which register contains the base value for the address calculation and an index field specifies which register contains the index value. A scale field specifies the power of two by which the index value will be multiplied before being added, along with any displacement, to the base value. The next instruction field is the optional displacement field 10, which may be one to four bytes in length. The displacement field 10 contains a constant used in address calculations. The optional immediate field 12, which may also be from one to four bytes in length, contains a constant used as an instruction operand. The shortest X86 instructions are only one byte long and comprise a single opcode byte.

FIG. 2—Exemplary EFLAGS Register

Turning now to FIG. 2, there is illustrated the EFLAGS register of an X86 processor. The EFLAGS register keeps condition codes, mode bits (i.e., status and control flag bits), as well as system flags. The bits within the EFLAGS register are defined in Table 1.

TABLE 1

| | | |
|---|---|---|
| Status Flags | | |
| Auxiliary Carry Flag | AF | Reports carry or borrow on least significant 4 bits of result |
| Carry Flag | CF | Reports a carry or borrow from most significant bit |
| Overflow Flag | OF | Reports a result which is an overflow |
| Parity Flag | PF | Set to 1 if lowest byte of result has even # of 1 bits |
| Sign Flag | SF | Set equal to high order bit of result (1 if negative) |
| Zero Flag | ZF | Cleared to 0 unless result is 0 |
| Control Flag | | |
| Direction Flag | DF | Controls direction of string instructions |
| System Flags | | |
| Alignment Check | AC | Controls alignment checking |
| ID Flag | ID | Used to identify the processor |
| Interrupt Enable Flag | IF | Controls response to interrupts |
| I/O Privilege Level | IOPL | Controls access to I/O address space |
| Nested Task | NT | Controls chaining of interrupted task |
| Resume Flag | RF | Temporarily disables debug faults |
| Trap Flag | TF | Controls entry into single step mode for debugging |
| Virtual 8086 Mode | VM | Places processor in virtual 8086 mode |
| Virtual Interrupt Flag | VIF | "Virtual" image of IF flag |
| Virtual Interrupt Pending Flag | VIP | Used in virtual 8086 and protected mode |

The status flags of the EFLAGS register report the results of arithmetic operations. The status flags are used by the conditional jump instructions to select either the sequential path or the target address path. The sixteen conditions based on the state of the CF, ZF, OF and PF bits of the EFLAGS register that are tested by conventional jump instructions are specified by a four bit condition code as part of the opcodes in the conditional jump instructions. If, for example, the condition code reads 0000, then the jump will occur if there is an overflow. The four bit condition codes of the conditional jump opcodes are set forth in Table 2 below.

TABLE 2

| | | |
|---|---|---|
| 0000 | O | Overflow |
| 0001 | NO | No overflow |
| 0010 | B, NAE | Below, Not above/equal |
| 0011 | NB, AE | Not below, Above/equal |
| 0100 | E, Z | Equal, Zero |
| 0101 | NE, NZ | Not equal, Not zero |
| 0110 | BE, NA | Below equal, Not above |
| 0111 | NBE, A | Not below equal, Above |
| 1000 | S | Sign |
| 1001 | NS | Not sign |
| 1010 | P, PE | Parity, parity Even |
| 1011 | NP, PO | Not parity, Parity Odd |
| 1100 | L, NGE | Less than, Not greater than/equal to |
| 1101 | NL, GE | Not less than, Greater than/equal to |
| 1110 | LE, NG | Less than/equal to, Not greater than |
| 1111 | NLE, G | Not less than/equal to, Greater than |

FIG. 3—Conditional Jump

Operation of the condition code conditional jump mechanism described above is illustrated in FIG. 3. Initially, an operation is performed which may cause the EFLAGS status bits or bit to be updated (step 20). Subsequently, a conditional jump instruction is executed. The conditional jump's opcode is read. More particularly, the condition code as described with regard to Table 2 is read (step 22). Next, the appropriate status bit in the EFLAGS register will be read and compared to the condition code set forth in the conditional jump opcode (step 24). If there is a match (step 26), the jump will be activated and the operation at the target address of the jump is executed (step 30). If in step 26 there is no match, the sequential operation is performed (step 28).

Another method for selectively performing operations is to use predicated instructions. Predicated instructions build the condition-checking task into individual instructions such that when they are executed, the operation is performed only if the specified condition is met. If the condition is not met, the operation is canceled, effectively making the instruction a no-op. The primary difference between conditional jumps and predicated instructions is that a conditional jump can instantly cancel a large number of instructions (including instructions which will be refetched and reexecuted). However, predicated instructions self-cancel on a one-by-one basis. In a pipelined processor, conditional jumps cause wasted cycles even with branch prediction if the conditional jump is mispredicted and the target address lies within the sequential path already fetched.

The use of conditional jumps versus predicated instructions is illustrated in Examples 1 and 2. Example 1 illustrates the use of a conditional jump to selectively perform certain operations (applying floor and ceiling functions to the elements of an array and maintaining counts of the number clipped).

```
clip_loop:

mov     eax, [ebx]          ;get array element n
    cmp     eax, MAXVAL         ;compare to ceiling value
                                (sets status flags)
    jle     check_low           ;jump if within range (tests
                                status flags)
    mov     [ebx], MAXVAL       ;replace with ceiling value
    inc     esi                 ;count occurrence of ceiling
                                clipping
check_low:

cmp     eax, MINVAL         ;compare to floor value
    jg      low_ok              ;jump if within range
    mov     [ebx], MINVAL       ;replace with floor value
    inc     edi                 ;count occurrence of floor
                                clipping
low_ok:

add     ebx, 4              ;increment array index
    dec     ecx                 ;decrement iteration count
    jnz     clip_loop           ;loop until entire array is
                                processed
```

EXAMPLE 1

Conditional Jump

In a highly pipelined processor, several instructions beyond the conditional jumps (JLE and JGT) may be fetched and sent down the pipe before the jump is executed. Only two of these are candidates to be skipped, but if a jump is taken and is mispredicted as not taken, the whole pipe is cleared and restarted at the third instruction past the jump. This results in more idle cycles while the pipe refills than the two skipped instructions would have used. The data dependent nature of the branches makes effective branch prediction difficult and so the performance of this code will suffer from time wasted in restarting the pipeline.

The same operations using predicated instructions (denoted by the suffixes .GT and .LE) is illustrated in Example 2 below:

```
clip_loop:

mov         eax, [ebx]          ;get array element n
    cmp         eax, MAXVAL         ;compare to ceiling value
                                    (sets status flags)
    mov.gt      [ebx], MAXVAL       ;replace with ceiling value if
                                    greater
    inc.gt      esi                 ;count occurrence of ceiling
                                    clipping if greater
    cmp         eax, MINVAL         ;compare to floor value
    mov.le      [ebx], MINVAL       ;replace with floor value if
                                    less than
    inc.le      edi                 ;count occurrence of floor
                                    clipping if less than
    add         ebx, 4              ;increment array index
    dec         ecx                 ;decrement iteration count
    jnz         clip_loop           ;loop until entire array is
                                    processed
```

EXAMPLE 2

Predicated Instruction

Predicated operations are always fetched and sent to execution, but are only carried out if the status flags set by the preceding compare instruction are in the proper state. Otherwise, they are effectively no-ops. In a scalar processor, each no-op is an idle cycle. For each compare that would have resulted in a taken branch, there are two idle cycles. But, since a cycle is eliminated by removing the branch instructions, the net loss is effectively one cycle, which is less than the pipe refill penalty.

In a superscalar implementation, the two predicated operations after each compare can be executed in parallel, not only with each other, but with other instructions in the sequence with no wasted cycles at all. Moreover, the two clipping operations can always be done in parallel, given sufficient execution resources, and will only be done once per element. The lower clipping operation need never be canceled and redone because of a mispredict on the upper one.

As processor speeds increase (and pipeline lengths increase as well), it is increasingly desirable to avoid the pipeline penalty imposed by conditional jumps. At the same time, however, it is desired to limit software overhead. Accordingly, there is a need for an X86 compatible processor employing predicated instructions with a minimum of software overhead.

SUMMARY OF THE INVENTION

Accordingly, a method and apparatus for providing predicated instructions in a processor employing out of order execution is provided herein. In one embodiment, a plurality of decode units are configured to decode a plurality of variable byte length instructions and to provide a plurality of output of signals. The output signals are provided to a plurality of reservation stations coupled to the plurality of decode units within the superscalar microprocessor. Functional units are configured to receive the output signals from the plurality of decode units. The functional units include function execution units coupled to receive signals from the plurality of reservation stations and to provide a function output responsive to the output signals. The functional units further comprise a predication unit configured to determine whether a predetermined condition has occurred and either stop the function output or allow the function output to be transmitted depending on whether the predetermined condition has occurred.

In one specific embodiment, an instruction encoding mechanism such as prefix bytes are provided for specifying a condition code upon which the instruction is predicated. Status flags in an EFLAGS register of the microprocessor are set by a particular instruction with subsequent instructions executed conditionally as controlled by the predication unit conditional execution encoding.

In another specific embodiment, predicated instruction execution is accomplished by providing a set of single bit predicate flags to control conditional execution and a mechanism for setting the flags based on status flag results. Thus the true/false value of a condition code is transferred to a predicate flag for storage to be used at a later time. The EFLAGS register may be used to accommodate the predicate flags. The predicate flags are set by specifying a condition code and a predicate flag to record the condition. For example, the SETcc instruction may be used to set or clear one of the predicate flags. An instruction which sets the status flags in the EFLAGS register is followed by one or more SETcc instructions to transfer the desired condition codes states to predicate flags. Alternatively, instruction prefixes may be defined that specify a condition code and predicate flag to be written based on the result of the associated instruction. Predication of an instruction is controlled by a prefix that specifies a particular predicate flag.

Finally, a third specific embodiment employs a combination of condition codes and predicate flags. Two sets of predicate prefixes are employed: one to specify use of a predicate flag and one to specify a condition code.

BRIEF DESCRIPTION OF THE DRAWINGS

Other objects and advantages of the invention will become apparent upon reading the following detailed description and upon reference to the accompanying drawings in which:

FIG. 1 is a diagram of a generic X86 type instruction;

FIG. 2 is a diagram of an EFLAGS register in an X86 type processor;

FIG. 7 illustrates a condition code based predicated instruction;

FIG. 8 illustrates an EFLAGS register with additional status flags for use with a condition code based predicated instruction;

Figure 3:
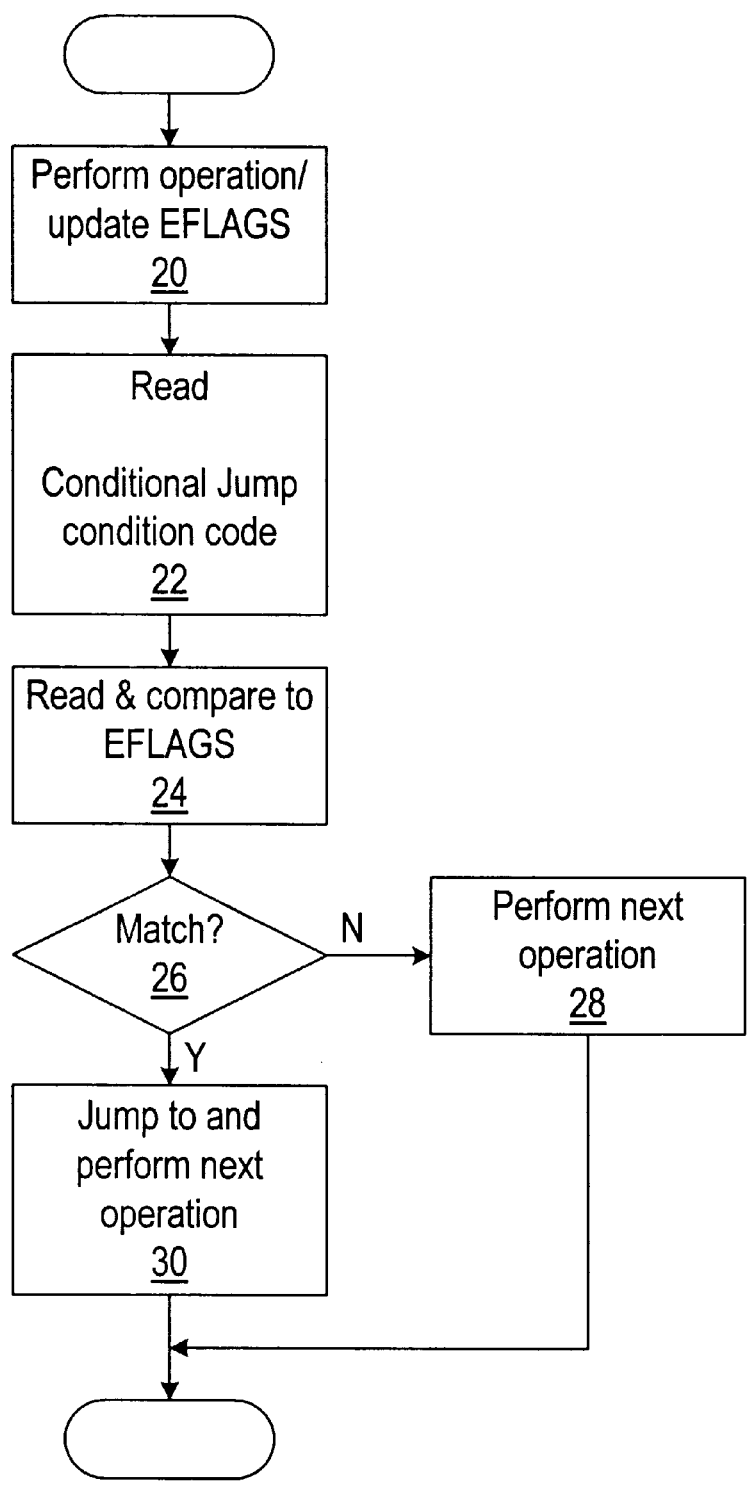
FIG. 3 is a flowchart illustrating typical operation of a conditional jump process.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 4:
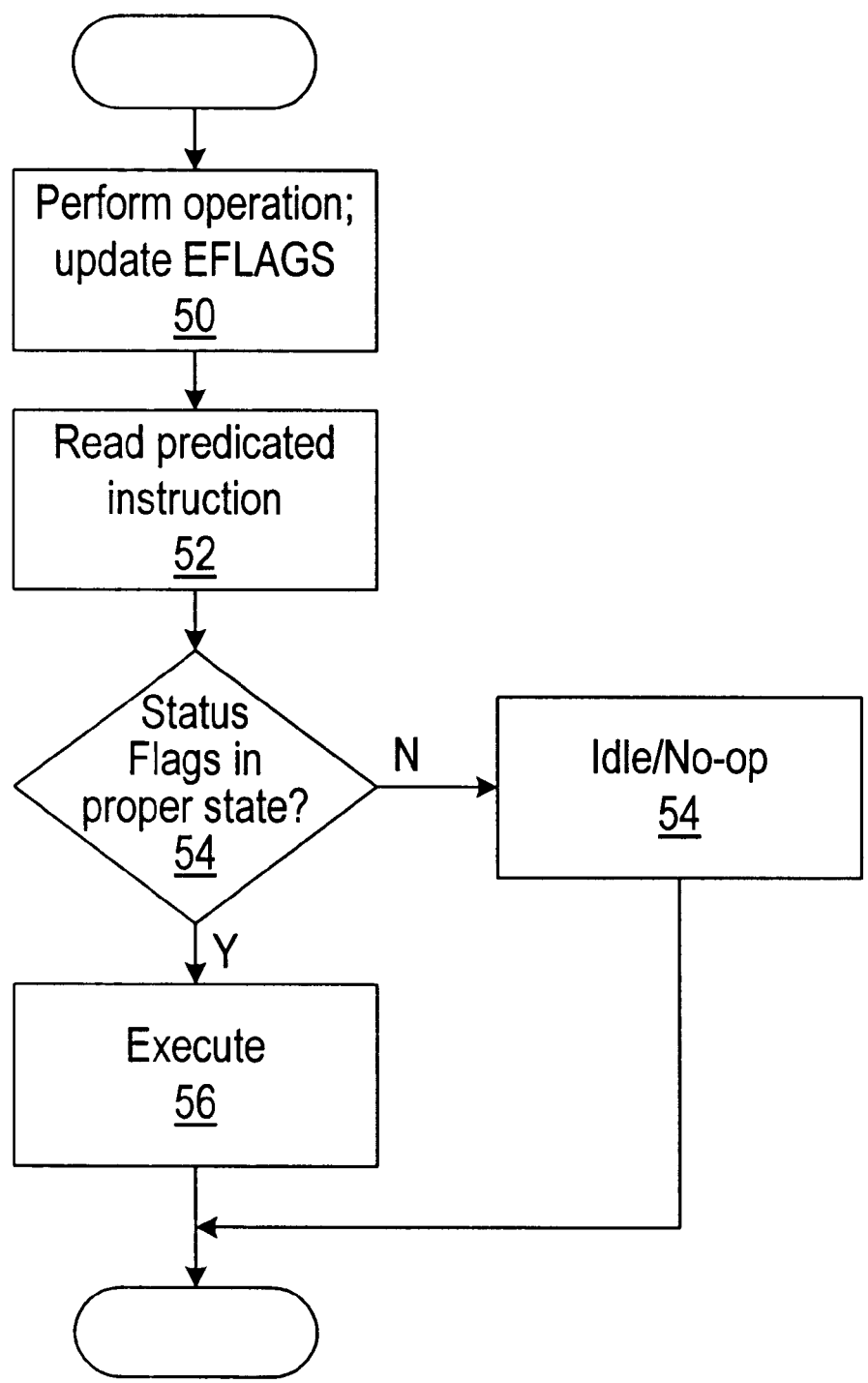
FIG. 4 is a flowchart illustrating operation of a typical predicated instruction type process.

FIG. 4—Flowchart of Predicated Instruction Execution

FIG. 4 illustrates the operation of the predicated instruction mechanism. Initially, an operation is performed which updates the EFLAGS register (step 50). Subsequently, a predicated instruction is executed. The predicated instruction is read (step 52). If the status flags (or predicate flags) have been set in step 50 to the proper state, then the predicated instruction is executed (step 56). If, however, the status flags were not in the proper state, then an idle or no-op operation occurs (step 58).

Figure 5:
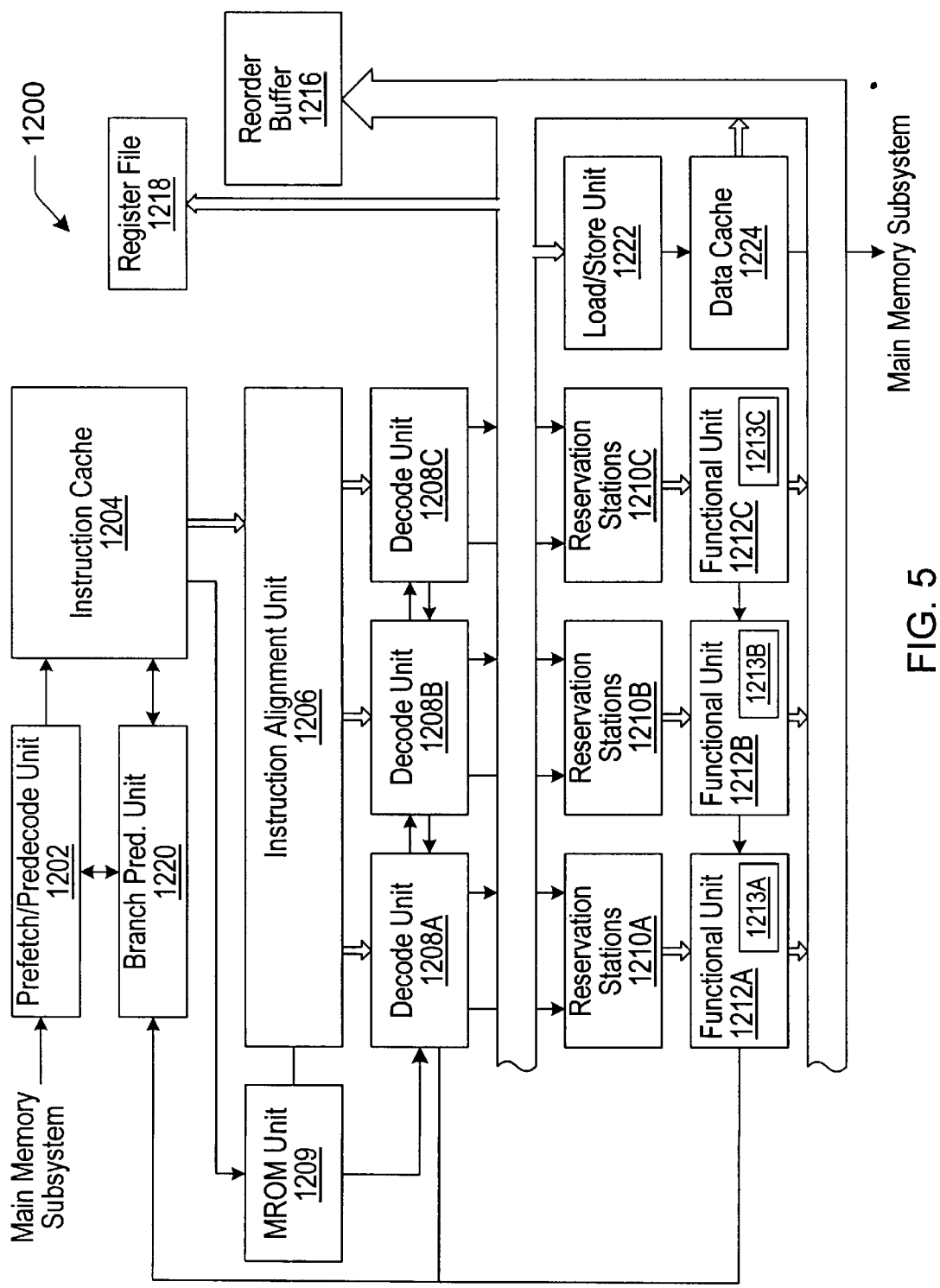
FIG. 5 is a block diagram of a processor according to one embodiment of the present invention.

FIG. 5—Microprocessor Employing Predicated Instruction Mechanism

Referring next to FIG. 5, a block diagram of a microprocessor 1200 including a predicated instruction mechanism is shown. As illustrated in FIG. 5, superscalar microprocessor 1200 (preferably an x86-type processor) includes a prefetch/predecode unit 1202 and a branch prediction unit 1120 coupled to an instruction cache 1204. A main memory, typically separate from processor 1200, is coupled to processor 1200 by way of prefetch/predecode unit 1202. Instruction alignment unit 1206 is coupled between instruction cache 1204 and a plurality of decode units 1208A–1208C (referred to collectively as decode units 1208). Each decode unit 1208A–1208C is coupled to a respective reservation station units 1210A–1210C (referred to collectively as reservation stations 1210), and each reservation station 1210A–1210C is coupled to a respective functional unit 1212A–1212C (referred to collectively as functional units 1212). Decode units 1208, reservation stations 1210, and functional units 1212 are further coupled to a reorder buffer 1216, a register file 1218 and a load/store unit 1222. A data cache 1224 is finally shown coupled to load/store unit 1222, and an MROM unit 1209 is shown coupled to instruction alignment unit 1206 and decode units 1208. Each functional unit 1212 includes a predication unit 1213A–1213C (referred to collectively as predication unit 1213), whose use will be described in greater detail below.

Generally speaking, instruction cache 1204 is a high speed cache memory provided to temporarily store instructions prior to their dispatch to decode units 1208. In one embodiment, instruction cache 1204 is configured to cache up to 32 kilobytes of instruction code organized in lines of 16 bytes each (where each byte consists of 8 bits). During operation, instruction code is provided to instruction cache 1204 by prefetching code from a main memory (not shown) through prefetch/predecode unit 1202. It is noted that instruction cache 1204 could be implemented in a set-associative, a fully-associative, or a direct-mapped configuration.

Prefetch/predecode unit 1202 is provided to prefetch instruction code from the main memory for storage within instruction cache 1204. In one embodiment, prefetch/predecode unit 1202 is configured to burst 64-bit wide code from the main memory into instruction cache 1204. It is understood that a variety of specific code prefetching techniques and algorithms may be employed by prefetch/predecode unit 1202.

As prefetch/predecode unit 1202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 1208 or whether the instruction must be executed by invoking a microcode procedure controlled by MROM unit 1209.

The X86 instructions that may be directly decoded by decode unit 1208 are referred to as "fast path" instructions. The remaining instructions of the X86 instruction set are referred to as "MROM instructions". MROM instructions are executed by invoking MROM unit 1209. When an MROM instruction is encountered, MROM unit 1209 parses and serializes the instruction into a subset of defined fast path instructions to effectuate a desired operation.

An instruction alignment unit 1209 to channel or "funnel" variable byte length instructions from instruction cache 1204 to fixed issue positions formed by decode units 1208A–1208F.

Before proceeding with a detailed description of the predicated instruction mechanism, general aspects regarding other subsystems employed within the exemplary superscalar microprocessor 1200 of FIG. 5 will be described. For the embodiment of FIG. 5, each of the decode units 1208 includes decoding circuitry for decoding the predetermined fast path instructions referred to above. In addition, each decode unit 1208A–1208F routes displacement and immediate data to a corresponding reservation station unit 1210A–1210F. Output signals from the decode units 1208 include bit-encoded execution instructions for the functional units 1212 as well as operand address information, immediate data and/or displacement data.

The superscalar microprocessor of FIG. 5 supports out of order execution, and thus employs reorder buffer 1216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 1216 is reserved upon decode of an instruction that involves the update of a register to thereby store speculative register states. Reorder buffer 1216 may be implemented in a first-in-first-out configuration wherein speculative results move to the "bottom" of the buffer as they are validated and written to the register file, thus making room for new entries at the "top" of the buffer. Other specific configurations of reorder buffer 1216 are also possible, as will be described further below. If a branch prediction is incorrect, the results of speculatively-executed instructions along the mispredicted path can be invalidated in the buffer before they are written to register file 1218.

The bit-encoded execution instructions and immediate data provided at the outputs of decode units 1208A–1208F are routed directly to respective reservation station units 1210A–1210F. In one embodiment, each reservation station unit 1210A–1210F is capable of holding instruction information (i.e., bit encoded execution bits as well as operand values, operand tags and/or immediate data) for up to three pending instructions awaiting issue to the corresponding functional unit. It is noted that for the embodiment of FIG. 5, each decode unit 1208A–1208F is associated with a dedicated reservation station unit 1210A–1210F, and that each reservation station unit 1210A–1210F is similarly associated with a dedicated functional unit 1212A–1212F. Accordingly, three dedicated "issue positions" are formed by decode units 1208, reservation station units 1210 and functional units 1212. Instructions aligned and dispatched to issue position 0 through decode unit 1208A are passed to reservation station unit 1210A and subsequently to functional unit 1212A for execution. Similarly, instructions aligned and dispatched to decode unit 1208B are passed to reservation station unit 1210B and into functional unit 1212B, and so on.

Upon decode of a particular instruction, if a required operand is a register location, register address information is routed to reorder buffer 1216 and register file 1218 simultaneously. Those of skill in the art will appreciate that the X86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 1216 is reserved for each instruction which, upon decode, modifies the contents of one of the real registers. Therefore, at various points during execution of a particular program, reorder buffer 1216 may have one or more locations which contain the speculatively executed contents of a given register. If following decode of a given instruction it is determined that reorder buffer 1216 has previous location(s) assigned to a register used as an operand in the given instruction, the reorder buffer 1216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 1216 rather than from register file 1218. If there is no location reserved for a required register in reorder buffer 1216, the value is taken directly from register file 1218. If the operand corresponds to a memory location, the operand value is provided to the reservation station unit through load/store unit 1222.

Reservation station units 1210A–1210F are provided to temporarily store instruction information to be speculatively executed by the corresponding functional units 1212A–1212F. As stated previously, each reservation station unit 1210A–1210F may store instruction information for up to three pending instructions. Each of the six reservation stations 1210A–1210F contain locations to store bit-encoded execution instructions to be speculatively executed by the corresponding functional unit and the values of operands. If a particular operand is not available, a tag for that operand is provided from reorder buffer 1216 and is stored within the corresponding reservation station until the result has been generated (i.e., by completion of the execution of a previous instruction). It is noted that when an instruction is executed by one of the functional units 1212A–1212F, the result of that instruction is passed directly to any reservation station units 1210A–1210F that are waiting for that result at the same time the result is passed to update reorder buffer 1216 (this technique is commonly referred to as "result forwarding"). Instructions are issued to functional units for execution after the values of any required operand(s) are made available. That is, if an operand associated with a pending instruction within one of the reservation station units 1210A–1210F has been tagged with a location of a previous result value within reorder buffer 1216 which corresponds to an instruction which modifies the required operand, the instruction is not issued to the corresponding functional unit 1212 until the operand result for the previous instruction has been obtained. Accordingly, the order in which instructions are executed may not be the same as the order of the original program instruction sequence. Reorder buffer 1216 ensures that data coherency is maintained in situations where read-after-write dependencies occur.

In one embodiment, each of the functional units 1212 is configured to perform integer arithmetic operations of addition and subtraction, as well as shifts, rotates, logical operations, and branch operations. It is noted that a floating point unit (not shown) may also be employed to accommodate floating point operations.

Each of the functional units 1212 also provides information regarding the execution of conditional instructions to the branch prediction unit 1220. If a branch prediction was incorrect, instruction cache 1204 flushes instructions not needed, and causes prefetch/predecode unit 1202 to fetch the required instructions from main memory. It is noted that in such situations, results of instructions in the original program sequence which occur after the mispredicted branch instruction are discarded, including those which were speculatively executed and temporarily stored in load/store unit 1222 and reorder buffer 1216. Exemplary configurations of suitable branch prediction mechanisms are well known.

Results produced by functional units 1212 are sent to the reorder buffer 1216 if a register value is being updated, and to the load/store unit 1222 if the contents of a memory location is changed. If the result is to be stored in a register, the reorder buffer 216 stores the result in the location reserved for the value of the register when the instruction was decoded. As stated previously, results are also broadcast to reservation station units 1210A–1210F where pending instructions may be waiting for the results of previous instruction executions to obtain the required operand values.

Generally speaking, load/store unit 1222 provides an interface between functional units 1212A–1212F and data cache 1224. In one embodiment, load/store unit 1222 is configured with a store buffer with eight storage locations for data and address information for pending loads or stores. Functional units 1212 arbitrate for access to the load/store unit 1222. When the buffer is full, a functional unit must wait until the load/store unit 1222 has room for the pending load or store request information. The load/store unit 1222 also performs dependency checking for load instructions against pending store instructions to ensure that data coherency is maintained.

Data cache 1224 is a high speed cache memory provided to temporarily store data being transferred between load/store unit 1222 and the main memory subsystem. In one embodiment, data cache 1224 has a capacity of storing up to eight kilobytes of data. It is understood that data cache 1224 may be implemented in a variety of specific memory configurations, including a set associative configuration.

Instructions which are not included within the subset of X86 instructions designated as fast path instructions are executed under the control of MROM unit 1209 using stored microcode. MROM unit 1209 parses instructions into a series of fast path instructions which are dispatched during one or more clock cycles.

When an MROM instruction within a line of code in latching unit 1202 is detected by MROM unit 1209, this instruction and any following it are not dispatched during the current cycle. Any instruction(s) preceding it are dispatched in accordance with the above description. During the following clock cycle(s), MROM unit 1209 provides series of fast path instructions to the decode units 1208 through instruction alignment unit 1206 in accordance with the microcode for that particular MROM instruction. Once all of the microcoded instructions have been dispatched to decode units 1208 through alignment unit 1206 to effectuate the desired MROM operation, the instructions which followed the MROM instruction are allowed to be dispatched.

Figure 6:
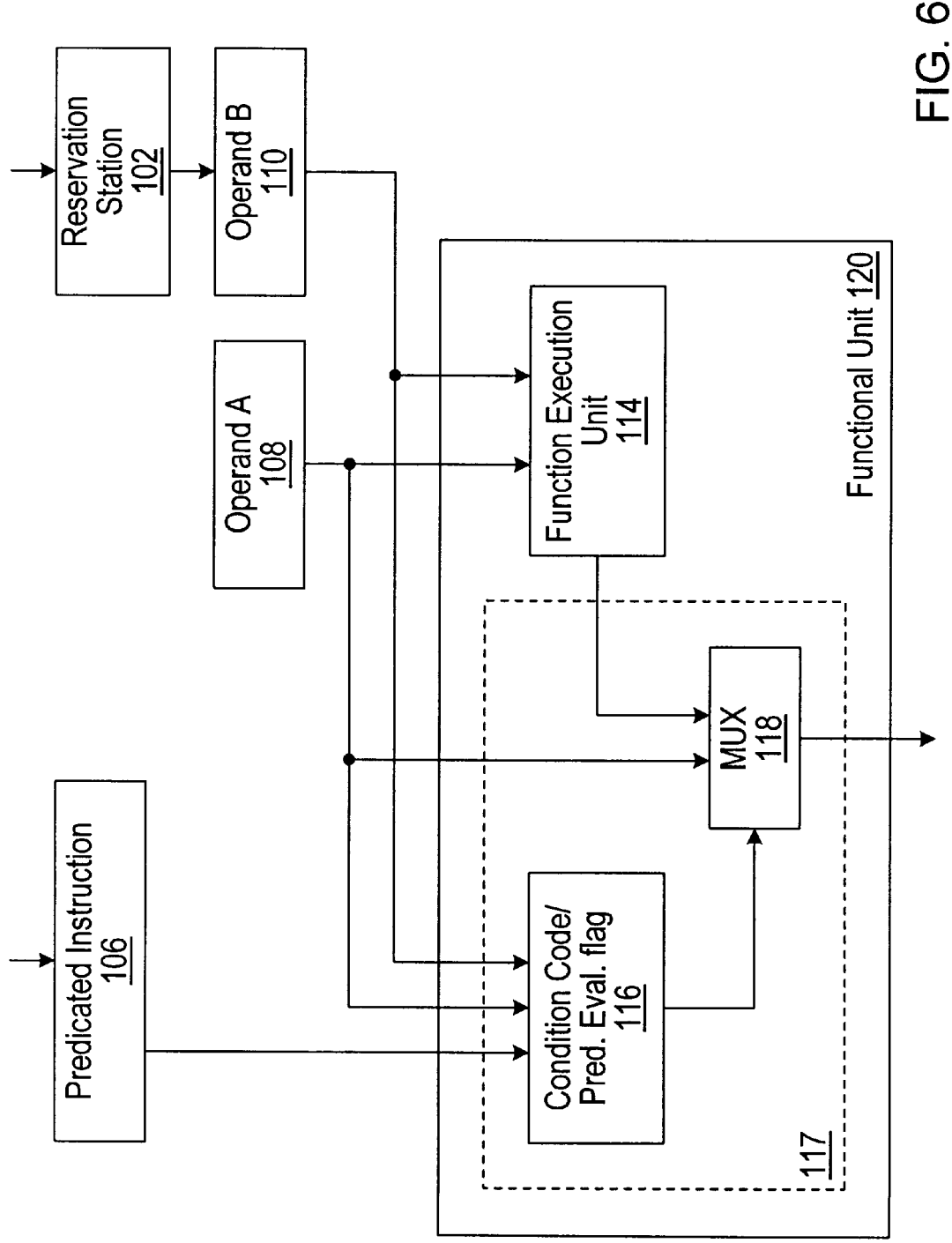
FIG. 6 is a diagram illustrating a pipeline for a predicated instruction in a processor employing out of order execution.

FIG. 6—Predication Mechanism

Turning now to FIG. 6, there is shown a predication mechanism for use in a processor such as processor 1200 implementing predicate execution and out of order instruction execution. Processor 1200 is, for example, an X86 compatible processor in which outstanding dependencies are resolved, as discussed above, by forwarding results into reservation station 102. Reservation station 102 may, for example, be reservation station 1210A, 1210B, or 1210C as shown in FIG. 5. An instruction that references a register that is the target of a predicated instruction has one of two possible dependencies: Either on the result of the predicated instruction if its condition for execution is met, or on the result of whichever prior instruction to the predicated instruction last updated the register. Thus, the predicated instructions are forwarded the original contents of the destination register as an input operand. FIG. 6 illustrates reservation station 102, which includes operand A 108, operand B 110, and predicated instruction 106. Additionally, FIG. 6 illustrates a functional unit 120, which includes predication unit 117 and execution unit 114. Functional unit 120 may, for example, be functional unit 1212A, 1212B, or 1212C. At the same time that the operation is performed the condition code or predicate flag is evaluated in evaluation unit 116, as will be discussed in more detail below. The result of the evaluation is used to control a multiplexer 118, which receives the result of execution unit 114 and the output from operand A 108 which stores the original contents of the destination operand. Multiplexer 118 selects either the result of the operation, if the predicate condition is true, or the input operand that is the original value of the destination, if the predicate condition is false. Multiplexer 118 is also coupled to functional unit 120. Further dependencies are handled by making subsequent instructions unconditionally dependent on the result of the predicated instruction without concern for the condition code or predicate flag.

If the predicate for a particular instruction is false, only the destination input operand 108 need be available and the instruction can be issued without waiting for any dependency on the other input operand to be resolved. Moreover, if a predicate for a particular instruction is known to be false when the instruction is decoded, dispatch logic 112 can avoid sending the instruction on to the functional unit 120 altogether simply by marking its re-order buffer entry as canceled Subsequent instructions would not detect dependencies on these canceled operations. It is noted that in an alternate embodiment, depending on how the instruction pointer is maintained, it is possible to avoid even using a reorder buffer entry.

FIG. 7—Condition Code Based Predicated Instruction

As noted above, predication information may be provided through either condition codes or predicate flags. Turning now to FIG. 7, there is shown a diagram of a condition code-based predicated instruction. The condition code-based predicated instruction includes a prefix 202, a condition code 204, an opcode 206, modR/M field 208, SIB field 210, displacement field 212 and immediate field 214. As with the generic X86 instruction, the prefix field, the modR/M field, SIB field, displacement field and the immediate field are optional. It is noted, however, that the condition code byte or bytes 204 may either be implemented as part of the opcode 206 or as part of prefix 202. Condition code 204 specifies the condition upon which the instruction is predicated. Status flags in the EFLAGS register are set by a particular instruction with subsequent instructions executed conditionally as controlled by the conditional execution encoding mechanism of the conditional code byte or bytes 204. Different instructions can specify different conditions for a given setting of the status flags in the EFLAGS register. For example:

```
cmp     eax, ebx      ;compare and set status flags
mov.ge  mem1, eax     ;store eax to mem1 if eax>=ebx
add     edx, mem1     ;add mem1 to edx
                      (unconditionally)
dec.ge ecx            ;decrement ecx if eax>=ebx
dec.lt ebx            ;decrement ebc if eax<ebx
```

It is noted that in a superscalar processor, it is desirable to have as much parallelism in coding sequences as possible. In one embodiment, this could be accomplished by rearranging independent instructions to be sequentially adjacent, thereby allowing parallel execution. However, the movement of such instructions can be inhibited by control dependencies. For example, an instruction which sets the status flags cannot be inserted between the cmp and dec instructions in the example above. To alleviate this, however, in a preferred embodiment, one or more additional sets of status flags are defined.

FIG. 8—EFLAGS Register with Additional Status Flags

Turning now to FIG. 8, there is shown a diagram of an EFLAGS register employing additional status flags. More particularly, two sets of additional status flags 216 and 218 are shown. Additional status flags 216 and 218 occupy the unused upper bytes of the EFLAGS register. In the example shown, the parity flag is omitted since it is very infrequently used so as to accommodate two full sets of status flags. The EFLAGS register is used for reasons of compatibility, i.e., so that the status flags are preserved on an interrupt by the existing X86 interrupt mechanism. It is noted that while two sets of additional status flags are shown in FIG. 8, preferably only one set is employed so as to permit, for example, expanded uses of other bits. Instructions which write the EFLAGS register specify in their opcodes, for example, which set of status flags to use. Alternatively, the condition code predicate prefix 204 in FIG. 7 may be expanded to identify which set of status flags is referenced.

As noted above, a predicated instruction is designated by a prefix which specifies the predicate. To be able to use the sixteen standard X86 conditions, sixteen different prefixes may be defined. Five redundant groups of eight single byte opcodes (PUSH, POP, INK, DEC AND XCHG) exist. These opcodes specify a general register in the lower three bits of the opcode and hence take up eight opcode positions per instruction. However, each of these instructions has a two byte modR/M style equivalent. Accordingly, these opcodes can be redefined to expand architectural functionality without losing any existing functionality. The sixteen predicate prefixes may be made available using two sets of the redundant single byte opcodes described above FIG. 9—Predicated Instruction with Extended Status Flag Specifiers FIG. 9 illustrates the condition code based predicated instruction with extended status flags specifiers. The predicated instruction includes prefix byte or bytes 220, a condition code prefix 222, a status flag identifier 224, opcode 226, modR/M field 228, SIB field 230, displacement field 232, and immediate field 234. As above, the prefix 220, modR/M field 228, SIB field 230, displacement field 232, and immediate field 234 are optional. The condition code field 222 and status flag identifier field 224 may be part of the opcode 226 or part of the prefix 220.

Figures 9, 10:
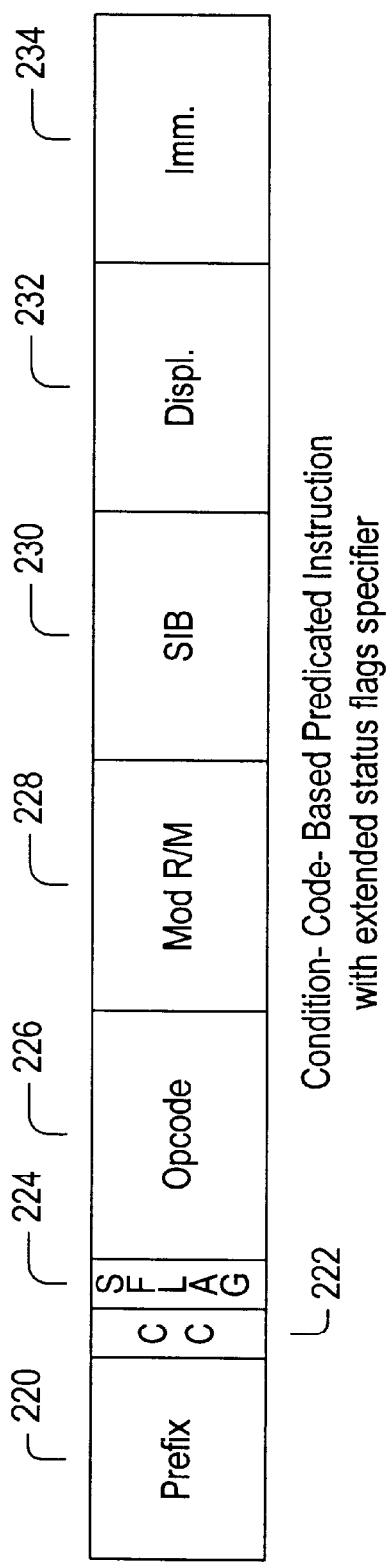
FIG. 9 illustrates a condition code based predicated instruction with extended status flags specifies for use with the EFLAGS register of FIG. 7.
FIG. 10 illustrates an EFLAGS register including predicate flags.

FIG. 10—EFLAGS Register Employing Predicate Flags

An alternative embodiment uses a predicate flag based predicated execution. This embodiment of predicated execution provides a set of single bit predicate flags to control conditional execution and an instruction encoding means for setting the EFLAGS based on status flag results. Essentially, the true/false value of a condition code is transferred to a predicate flag for storage to be used at a later time. Again, for backwards compatibility, the available space in the EFLAGS register is used and can accommodate eight predicate flags.

Figure 11:
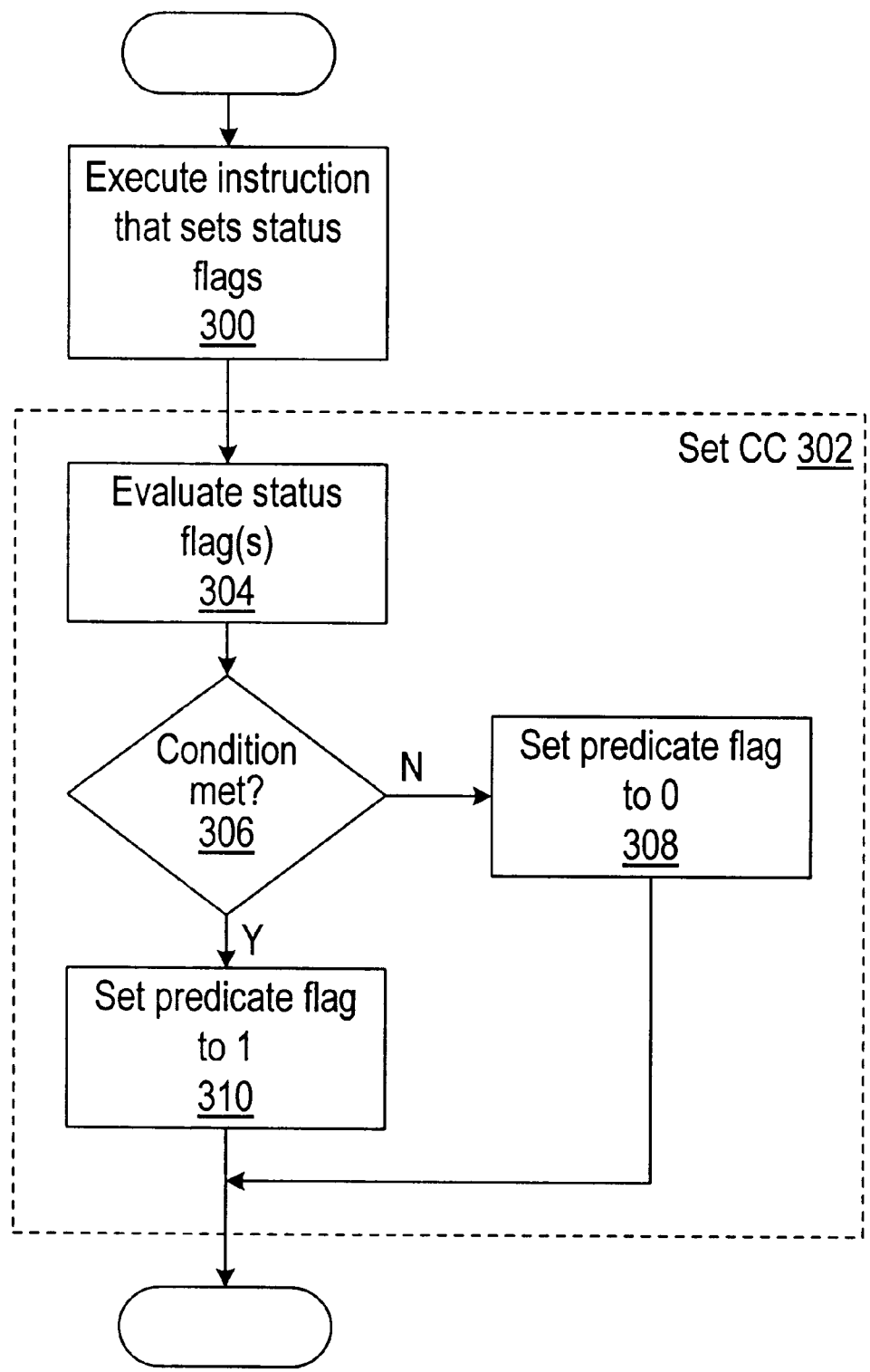
FIG. 11 illustrates one method of setting the predicated flags of the EFLAGS register of FIG. 10 according to one embodiment of the present invention.

FIG. 11—Encoding Predicate Flags

One method of encoding the predicate flags is by redefining the SETCC instructions, which already specify the sixteen condition codes, to set or clear one of the eight predicate flags rather than writing one of the general registers. Turning now to FIG. 11, the process of setting one of the predicate flags employing the SETCC command is shown. Initially, an instruction is executed that will set the status flags (step 300). Next, the SETCC command will be executed (step 302). Initially, the status flags will be evaluated (step 304). If the appropriate condition has been met, the SETCC command will set the specified predicate flag to one (step 310). If, on the other hand, the relevant condition in step 306 was not met, then the predicate flag would be set to zero (step 308). In this fashion, the condition code is specified and a predicate flag records the condition. Thus, an instruction which sets the status flags is followed by one or more SETCC instructions to transfer the desired condition code states to predicate flags.

An alternate method for setting predicate flags is to define instruction prefixes that specify a particular condition code and a predicate flag to be written based on the result of the associated predicated instruction. The prefixes may be made available by redefining redundant single byte instruction encodings such as exist as discussed above for PUSH, POP, INC, and DEC.

Figure 12:
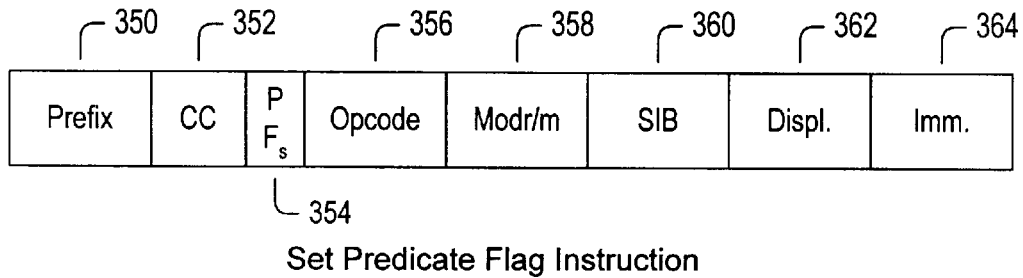
FIG. 12 illustrates a set predicate flag instruction to permit the setting of the predicate flags in the EFLAGS register of FIG. 10 according to one embodiment of the present invention.

FIG. 12—Set Predicate Flag Instruction

Turning now to FIG. 12, there is shown a diagram of a set predicate flag instruction. Set predicate flag instruction includes an optional prefix field 350, a condition code field 352, a predicate flag specifier field 354, and an opcode field 356. The condition code field 352 and the predicate field specifier 354 may be part of either opcode 356 or prefix 350. In addition, the set predicate flag instruction includes an optional modR/M 358, SIB field 360, displacement field 352, and immediate field 364. The condition code prefix 352 specifies one of the sixteen condition codes and the predicate flag prefix 354 specifies the destination predicate flag. This method allows the setting of a predicate flag to be accomplished in a single instruction rather than by a separate instruction. However, it is noted that the SETCC form may be used to report multiple conditions from one instruction. The use of predicate setting prefixes allows the setting of a predicate flag without updating the status flags in the EFLAGS register.

Figure 13:
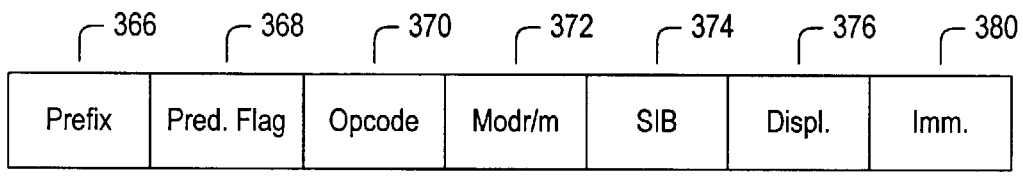
FIG. 13 illustrates a predicated instruction identifying a predicate flag or flags according to one embodiment of the present invention.

FIG. 13—Predicated Instruction Identifying Predicate Flags

Turning now to FIG. 13, there is shown a predicated instruction identifying the predicate flags. The predicated instruction includes an optional prefix field 366, a predicate flag field 368, an opcode field 370, an optional modR/M byte 372, an optional SIB byte 374, an optional displacement field 376, and an optional immediate field 380. The predicate flag prefix 368 specifies a particular flag. It is often desirable to have the complement of the condition available as well as the condition itself. While this could be handled via two SETCC instructions on two predicate flags, a more efficient use of the EFLAGS may be to specify the complement of a predicate when it is used. To this end, one flag and a second set of eight prefixes may be defined. Thus, the set predicate flag prefixes illustrated in FIG. 11 need only specify the eight true conditions, not their complement. Thus, a total of four sets of eight prefixes to set one of eight flags for one of eight conditions and test the true or complement of each of the eight flags is defined. (Thus, the predicate flag field 368 in predicated instruction may include two bytes.) These prefixes could be made available using the redundant single byte instruction encodings such as exist for PUSH, POP, INC and the like.

Figure 14:
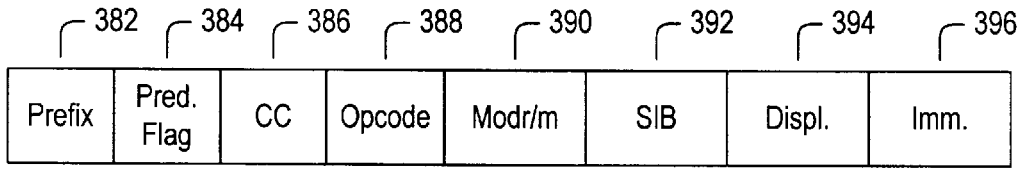
FIG. 14 illustrates a predicated instruction including both condition code and predicate flags according to one embodiment of the present invention.

FIG. 14—Predicated Instruction Employing Condition Codes and Predicate Flags

It is noted that in an alternative embodiment a combination of both methods is employed using the existing set of status flags plus eight predicate flags. Two sets of predicate prefixes are defined, one to specify the use of a predicate flag, and one to specify a condition based on the current state of the status flags. Such a predicated instruction is illustrated in FIG. 14. The predicated instruction including both condition code and predicate flag prefixes encodes a prefix field 382, a predicate flag field 384, condition code field 386, opcode 388, optional modR/M field 390, optional SIB field 392, optional displacement field 394, and optional immediate field 396. It is noted that predication could apply to branch operations as well as ALU and load store operations, including call, return, and jump indirect, all of which would have the same functionality as the JCC instruction.

Finally, it is noted that a problem compilers face when rearranging X86 instructions for parallelism is the lack of control over status flag updates and dependencies. Status flag updates are done implicitly by most arithmetic and logical operations. Accordingly, there is typically little opportunity to move an instruction which sets the status flags away from the instruction that tests them without running into an otherwise independent instruction that will corrupt the desired status flag result. Another difficulty is that it is often desirable to update the status flags on a simple move operation, but there is no provision for this in the standard X86 instruction set—an extra arithmetic or logical operation, such as adding zero, must be performed.

These difficulties can be eliminated by changing to an explicit update method of setting the EFLAGS, whereby instructions update the EFLAGS only when specified by a prefix or other mechanism. Since most instructions do not need to update the EFLAGS, the use of these prefixes does not contribute much to code size expansion. Thus, the prefix bytes described with regard to the instructions, including the general X86 instruction, are provided with a flag update prefix as necessary. Using this technique in an out-of-order system processor allows branch conditions to be set up earlier and tested by the branch well before several intervening operations may have completed, thereby allowing earlier branch resolution and recovery from these predictions.

While the invention is susceptible to various modifications and alternative forms, specific embodiments thereof are shown by way of example in the drawings and have been described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

What is claimed is:

1. A method for performing predicated instruction execution, comprising:
  encoding a first instruction with a condition code that identifies a condition specified by a status bit in a status register;
  executing a second instruction, wherein said executing includes setting said status bit in said status register;
  executing said first instruction, wherein said executing said first instruction includes:
    decoding said condition code;
    reading said status bit responsive to said decoding;
    performing a first operation or a second operation depending on a state of said status bit;
    generating an output of said first instruction in response to an input operand;
    providing said output in response to performing said first operation; and
    providing said input operand of said first instruction in response to performing said second operation.

2. The method of claim 1, further comprising associating said status bit with a set of status flags in said status register.

3. The method of claim 2, wherein said encoding a first instruction comprises identifying with which set of status flags said status bit is associated.

4. The method of claim 3, wherein said decoding said condition code comprises identifying with which set of status flags said status bit is associated.

5. The method of claim 4, wherein said reading comprises reading said status bit responsive to identifying with which set of status flags said status bit is associated.

6. The method of claim 1, wherein said encoding comprises encoding an instruction prefix.

7. The method of claim 1, wherein said status register is an EFLAGS register.

8. A method for performing predicated instruction execution, comprising:
  encoding a first instruction with a condition code that identifies a condition specified by a status bit in a status register;
  executing a second instruction, wherein said executing includes setting said status bit in said status register;
  setting a predicate flag in said status register responsive to said setting said status bit;
  executing said first instruction, wherein said executing said first instruction includes:
    decoding said condition code;
    reading said predicate flag responsive to said decoding;
    performing a first operation or a second operation depending on a state of said predicate flag;
    generating an output of said first instruction in response to an input operand;
    providing said output in response to performing said first operation; and
    providing said input operand of said first instruction in response to performing said second operation.

9. The method of claim 8, wherein said setting a predicate flag comprises executing a third instruction which transfers a state of said status bit to said predicate flag.

10. The method of claim 8, wherein said setting a predicate flag comprises decoding a prefix in said second instruction, said prefix identifying a predicate flag to be set, responsive to said status bit being set.

11. The method of claim 8, wherein said encoding a first instruction with a condition code that identifies a condition specified by a status bit in a status register further comprises identifying a predicate flag in which said condition is recorded.

12. A microprocessor comprising:
   a reservation station, wherein said reservation station is configured to receive an instruction, a first operand, and a second operand; and
   a functional unit coupled to said reservation station, wherein said functional unit is configured to receive said instruction, said first operand, and said second operand from said reservation station, and wherein said functional unit comprises:
      a functional execution unit configured to receive said instruction, said first operand, and said second operand from said reservation station, and wherein said functional execution unit is configured to provide a function output in response to said instruction, said first operand, and said second operand; and
      a predication unit configured to determine whether a predetermined condition has occurred, wherein said predication unit is configured to transmit said functional output if said predetermined condition has occurred, and wherein said predication unit is configured to transmit said first operand if said predetermined condition has not occurred.

13. The microprocessor of claim 12, further including a status register operably coupled to said reservation station and said functional unit, and wherein said predication unit is configured to read a bit in said status register indicative of whether said predetermined condition has occurred.

14. The microprocessor of claim 13, wherein said instruction corresponds to an x86 compatible instruction.

15. The microprocessor of claim 14, wherein said status register is an EFLAGS register.

16. The microprocessor of claim 15, wherein said bit is a first status flag bit in said EFLAGS register.

17. The microprocessor of claim 15, wherein said bit is a predicate flag bit in said EFLAGS register.

18. The microprocessor of claim 15, wherein said predicate flag bit in said EFLAGS register is set responsive to an evaluation of a status flag.

19. The microprocessor of claim 18, wherein said predicate flag is set by a SETcc command.

20. The microprocessor of claim 18, wherein said predicate flag is set by an instruction prefix that specifies a condition code.

21. The microprocessor of claim 13, wherein said predication unit includes a combinatorial logic unit configured to receive said function output and said first operand and is configured to issue one or the other of said function output or said first operand depending on whether said predetermined condition has occurred.

22. The microprocessor of claim 5, wherein said combinatorial logic unit is a multiplexer.

* * * * *